United States Patent
Komatsu

(10) Patent No.: US 6,756,546 B2
(45) Date of Patent: Jun. 29, 2004

(54) COMBINATION WEIGHING APPARATUS

(75) Inventor: Toshiyuki Komatsu, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 66 days.

(21) Appl. No.: 10/282,102

(22) Filed: Oct. 29, 2002

(65) Prior Publication Data

US 2003/0089529 A1 May 15, 2003

(30) Foreign Application Priority Data

Nov. 15, 2001 (JP) .................................... 2001-350464

(51) Int. Cl.$^7$ ............................................. G01G 19/387
(52) U.S. Cl. ................................................... 177/25.18
(58) Field of Search ............................. 177/25.18, 58, 177/245

(56) References Cited

U.S. PATENT DOCUMENTS 4,844,191 A * 7/1989 Mikami et al. ......... 177/25.18

FOREIGN PATENT DOCUMENTS

JP 08-054278 2/1996

* cited by examiner

*Primary Examiner*—Randy W. Gibson
(74) *Attorney, Agent, or Firm*—Staas & Halsey LLP

(57) ABSTRACT

A dispensing table assembly is divided along a line of division into two dispensing tables 6 and 6. Each of the dispensing tables 6 and 6 so divided has a partition wall 33 secured to a cut edge 6a, which is left along the line of division, so as to extend upright. Each of the dispensing tables 6 and 6 has a distributing point T defined at a location distant from the partition wall 33 for distributing articles to be weighed, which have been supplied from above, uniformly onto the dispensing table. Each of the dispensing tables 6 and 6 also has inclined surface areas P1 and P6 inclined downwardly from the distributing point T towards the partition wall 33.

8 Claims, 8 Drawing Sheets

COMBINATION WEIGHING APPARATUS

BACKGROUND OF THE INVENTION

1. Field of the Invention

The present invention generally relates to a combination weighing apparatus for performing a combination weighing of articles and, more particularly to a dispensing table assembly employed in such combination weighing apparatus.

2. Description of the Prior Art

A combination weighing apparatus used for weighing various types of articles generally includes a dispensing table assembly distributing the articles to be weighed, supplied from above by the effect of gravity, over the dispensing table assembly, a plurality of troughs arranged in a pattern radially of and below an outer peripheral edge of the dispensing table assembly, a plurality of pooling hoppers arranged in a circular row and positioned immediately below respective front ends of the troughs, and a corresponding number of weighing hoppers positioned immediately below the respective pooling hoppers. The weighing hoppers when receiving the articles from the dispensing table assembly through the troughs and pooling hoppers perform weighing of the articles to determine respective weights of the articles within the respective weighing hoppers so that a combination calculation can be performed using the weights of the articles measured respectively within the weighing hoppers in such a way as to select an optimum combination of articles in which the sum of the measured weights of those articles meets or closely approximate to a target weight or number. The articles, of which weights have satisfied the optimum combination, are subsequently discharged from the associated weighing hoppers onto a collecting chute to eventually provide products satisfying the target weight.

In this type of the combination weighing apparatus, it is necessary for a predetermined quantity of the articles to be weighed to be supplied and distributed from the dispensing table assembly onto the troughs. By way of example, if the articles are unable to be supplied from some troughs towards associated weighing hoppers, such weighing hoppers will be excluded from the combination calculation, and if the number of the weighing hoppers excluded from the combination calculation is many, it may occur that a predetermined weight condition to be satisfied during the combination calculation will not be satisfied, resulting in reduction in weighing accuracy and efficiency. Also, if even though the articles are satisfactorily supplied, the amount of the articles so supplied to some weighing hoppers is extremely small, selection of the weighing hoppers for the combination calculation would be difficult, resulting in stagnation of the articles within such some weighing hoppers for a substantial length of time. In particular, where the dispensing table assembly is divided into a plurality of dispensing tables so that the different kinds of the articles are weighed simultaneously, respectively, it will become necessary to employ partition walls secured to respective divided edges of the dispensing tables for preventing some of the articles supplied onto one of the dispensing tables from entering the other of the dispensing tables and, also, to generally vibrate those dispensing tables. When the dispensing tables are so vibrated, the articles collide with the partition walls and then jump backwards to such an extent as to result in an insufficient amount of the articles being supplied onto some of the troughs in the vicinity of the divided edges of the dispensing tables and, hence, an insufficient amount of the articles are supplied into the respective weighing hoppers, thereby posing a detrimental problem.

In order to cope with the above discussed problem, the Japanese Laid-open Patent Publication No. 8-54278 discloses a combination weighing apparatus which employs a cone-shaped dispensing table assembly divided into two halves, each comprised of a generally sector shaped dispensing table. Each of the resultant dispensing tables has a partition wall secured to a divided edge thereof for preventing some of the articles to be weighed dispensed onto one of the dispensing tables from entering the other of the dispensing tables. Each of the dispensing tables has an angle of inclination along a generatrix of the surface on which the articles are dispensed, which angle of inclination is continuously varied in a circumferential direction so that the greatest angle of inclination is attained in the vicinity of an outer end of the partition wall and the smallest angle of inclination is attained on the generatrix of the article dispensing surface positioned at an intermediate location as viewed from the site where the greatest angle of inclination is defined. By so designing, the articles to be weighed can be uniformly delivered even onto troughs positioned adjacent the partition walls.

However, it has been found that the combination weighing apparatus disclosed in the above mentioned publication has a problem. Specifically, despite the fact that the distributing point represented by a vertex of the respective dispensing table is defined at a location adjacent the divided edge, two supply members for supplying the articles onto the associated dispensing tables cannot be disposed immediately above the associated distributing points for avoiding any possible mixing of the articles on those dispensing tables and, therefore, the two supply members have no way other than to be disposed in side-by-side relation with each other in a horizontal direction. In this arrangement disclosed in the above mentioned publication, the supply members that ought to be positioned immediately above the distributing points, respectively, have their centers of supply that are separated in a radial direction perpendicular to the partitioning walls and, as a result thereof, most of the articles falling from the supply members onto the dispensing tables tend to be biased in a direction of the greatest inclination at a falling position and will not be sufficiently distributed from the falling position towards the partition wall. Accordingly, the surface area of each of the dispensing tables is reduced by a quantity corresponding to the thickness of the associated partition wall and the amount of the articles to be supplied towards the troughs positioned adjacent the partition wall where the amount of the article is small is further decreased, resulting in insufficient supply of the articles towards such troughs.

Also, even if the dispensing tables are circumferentially vibrated by respective vibrating mechanisms to move the articles toward the partition wall in a circumferential direction, some of the articles colliding with the partition wall may be repelled backwardly by the partition wall and will not stagnate in the vicinity of the partition wall.

SUMMARY OF THE INVENTION

In view of the foregoing, the present invention is intended to provide a combination calculating apparatus employing a dispensing table assembly which is divided into a plurality of dispensing tables with partition walls, each secured to a divided edge of each of the dispensing tables, wherein each of the dispensing tables is so designed as to allow articles to be weighed to be uniformly dispensed even to an area adjacent the partition wall so that the articles can eventually be delivered onto a plurality of troughs uniformly.

In order to resolve the above discussed problems, the present invention is featured in the following construction.

In the first place, the present invention is featured in a combination weighing apparatus which includes a generally round dispensing table assembly, a plurality of article delivery devices arranged below and radially of an outer peripheral edge of the dispensing table assembly for receiving articles to be weighed from the dispensing table assembly, and a corresponding number of weighing devices disposed below respective front ends of the delivery devices. The dispensing table assembly is comprised of a plurality of divided dispensing tables obtained by dividing the dispensing table assembly across a geometric center thereof, and at least one of the dispensing tables includes a partition wall secured to a cut edge thereof, which is left along a line of division of the dispensing table assembly, so as to extend upright. The at least one dispensing table also includes a distributing point defined at a location spaced a distance from the partition wall for distributing the articles, supplied from above the dispensing table assembly, over the dispensing table. This at least one dispensing table further includes an inclined surface area that is inclined downwardly from the distributing point towards the partition wall.

The distributing point referred to above is the point at which the articles to be weighed are distributed and is not always aligned with the point at which the articles being supplied fall.

According to this invention, the articles supplied from above onto the dispensing tables are dispensed towards the plural article delivery devices while falling along the dispensing tables and are then supplied to the plural weighing devices.

In such case, each of the dispensing tables has the distributing point defined at a location distant from the partition wall for distributing the articles supplied from above towards a peripheral region of the respective dispensing table and inclined surface areas inclined downwardly from the distributing point towards the partition wall. Accordingly, the articles to be weighed which have fallen onto the dispensing tables are assuredly distributed over the inclined surface areas towards respective regions adjacent the partition walls. This is particularly advantageous in that there is no possibility of shortage of the amount of the articles eventually delivered onto the delivery devices positioned adjacent the partition walls and, therefore, the articles to be weighed can be substantially uniformly distributed to the plural delivery devices.

Also, even if, for example, some of the articles to be weighed when the dispensing tables are vibrated in a circumferential direction collide with the associated partition walls and are then repelled backwardly towards the peripheral region, the provision of the inclined surface areas inclined downwardly towards the partition walls is effective to allow such some of the articles, once repelled backwardly in contact with the partition walls, to be again repelled towards the partition walls so as to fall along the inclined surface areas towards the partition walls. For this reason, there is no possibility that the amount of the articles adjacent the partition walls will decrease as a result of repellent in contact with the partition walls.

It is to be noted that the distributing point of each of the dispensing tables referred to above may not be always defined at the highest position of the respective dispensing table, provided that it serves as the point at which the articles to be weighed that are supplied from above by the effect of gravity can be distributed.

In one embodiment of the present invention, the dispensing table has a plurality of downwardly-inclined surface areas defined by a corresponding number of lines of division that extend from the distributing point towards an outer peripheral edge of the dispensing table, wherein at least some of the plural surface areas which deliver some of the articles towards the corresponding delivery devices are inclined at an virtually equal angle with respect to each other.

Also, since each of the dispensing tables is provided with the a plurality of the downwardly-inclined surface areas defined by a corresponding number of the lines of division that extend from the distributing point towards the outer peripheral edge of the respective dispensing table, some of the plural surface areas which deliver some of the articles towards the corresponding delivery devices being inclined at an virtually equal angle with respect to each other, there is no possibility of the articles being biased towards particular surface areas which would occur when each dispensing table has surface areas of different angles of inclination and the articles can therefore be substantially uniformly dispensed.

Preferably, the surface areas that adjoin the partition wall lie substantially perpendicular to the partition wall.

According to this construction, since the surface areas adjoining the partition wall lie substantially perpendicular to the partition wall, there is no possibility that the articles dispensed to those surface areas through the surface areas that are inclined downwardly towards the partition wall are urged against the partition wall and therefore stagnate in the vicinity of the partition wall to such an extent as to move little, and such articles can move smoothly towards the peripheral edge.

In a preferred embodiment of the present invention, a plurality of vibrating mechanisms operable to vibrate the associated dispensing tables, respectively, are employed and each of the vibrating mechanisms has a center of vibration that is aligned with a center of gravity of the associated dispensing table.

According to this preferred embodiment, since each of the dispensing tables is stably vibrated substantially about the center of gravity thereof, further uniform dispensing of the articles to be weighed is possible.

Preferably, each of the vibrating mechanisms is operable to vibrate the associated dispensing table up and down.

According to this construction, since the articles on the dispensing tables are vibrated up and down, even though some of the articles to be weighed collide with the partition walls, components of force repelling some of the articles away from the partition walls are small and, accordingly, it is possible to suppress reduction of the amount of the articles in the vicinity of each of the partition walls.

Also, in another embodiment of the present invention, each of the dispensing tables is formed by a bent plate member.

With this structure, since each of the dispensing tables is formed by bending the plate member, not only can a process be simplified, but the cost of the processing can also be reduced.

Also, since each of the dispensing tables so formed is defined by a combination of surface areas, it is possible to form surface areas appropriate to the various delivery devices and, therefore, there is no possibility of occurrence that the articles are distributed unequally.

According to a further embodiment of the present invention, a supply member for supplying the articles to be weighed towards the distributing point is employed and has a center of supply of the articles being positioned above the distributing point.

In the meantime, in view of the fact that by the present invention the distributing point is defined at a location spaced from the divided edge of the respective dispensing table, it has now become possible to dispose immediately above the respective distributing points the supply members for supplying the articles to be weighed onto the dispensing tables by the effect of gravity, with respective centers of supply aligned with the associated distributing points. Accordingly, with the structure according to the further embodiment, in view of the fact that the articles to be weighed fall towards the distributing points of the associated dispensing tables, the articles to be weighed so supplied can be further uniformly dispensed.

Preferably, a top of each of the supply members represents an inverted conical shape.

With this structure, since the top of each of the supply members has an inverted conical shape, it is possible to render each supply member to have an opening at a lower height than that of the supply member of a type in which the opening can have no way other than to be enlarged in a lateral direction, and therefore, the space for installation can be reduced.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Hereinafter, various preferred embodiments of the present invention will be described in details with reference to the accompanying drawings.

[Overview of Combination Weighing Apparatus]

Figure 1:
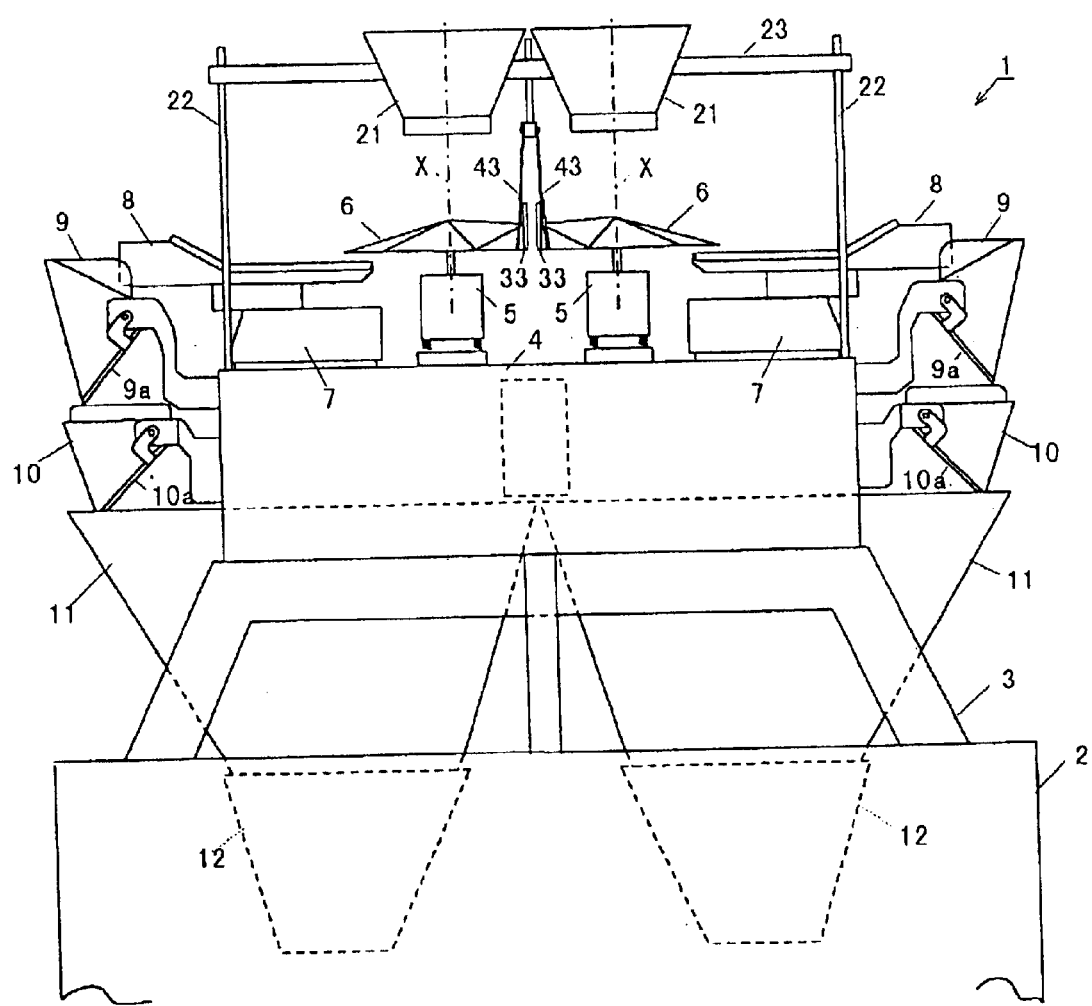
FIG. 1 is a schematic side view of a combination weighing apparatus according to the present invention.

Referring to FIG. 1, the combination weighing apparatus is generally identified by 1 and includes a support structure 2 having a support frame 3, a machine body 4 mounted atop the support frame 3, a pair of vibrating mechanisms 5 and 5 mounted atop the machine body 4 at respective locations leftwardly and rightwardly of a vertically extending longitudinal axis of such apparatus 1 for inducing vibrations in a direction up and down, that is, in a vertical direction, a dispensing table assembly made up of a pair of divided dispensing tables 6 and 6 as will be described in detail later and mounted on the machine body 4 through the vibrating mechanisms 5 and 5, and a plurality of vibrating mechanisms, generally identified by 7, arranged radially of the longitudinal axis of the apparatus and positioned adjacent an outer perimeter of the dispensing table assembly (See FIG. 2) so as to induce vibrations acting in a direction conforming to the direction of delivery of articles as will be described later.

The combination weighing apparatus 1 also includes a plurality of troughs generally identified by 8 arranged radially of the longitudinal axis of the apparatus 1 for receiving articles dispensed from the dispensing table assembly, a corresponding number of pooling hoppers generally identified by 9 and arranged in a substantially circular row coaxial with the longitudinal axis of the apparatus 1 and positioned immediately below outer ends of the troughs 8, respectively, and a corresponding number of weighing hoppers generally identified by 10 and positioned immediately below the associated pooling hoppers 10.

The combination weighing apparatus 1 furthermore include guide chutes generally identified by 11, each having an upper end positioned immediately below the associated weighing hopper 10 and inclined downwardly therefrom and generally radially inwardly of the longitudinal axis of the apparatus 1, and collecting chutes generally identified by 12. The collecting chutes 12 are generally positioned beneath the divided dispensing tables 6 and 6, respectively, and each of the collecting chutes 12 is positioned below the lower ends of the guide chutes 11 in communication with a group of the guide chutes 11 associated with each divided dispensing table 6. The collecting chutes 12 are in turn communicated with a common collecting hopper (not shown) positioned immediately below respective lower open ends of the collecting chutes 12 Each of the pooling hoppers 9 has a lower end formed with a discharge port that is selectively opened or closed by a respective gate 9a controllably hinged to, for example, the pooling hopper 9 and, similarly, each of the weighing hoppers 10 has a lower end formed with a discharge port that is selectively opened or closed by a respective gate 10a controllably hinged to, for example, the weighing hopper 10. Although not shown, the gates 9a of the pooling hoppers 9 and the gates 10a of the weighing hoppers 10 paired with the corresponding pooling hoppers 9 and weighing hoppers 10 are drivingly and controllably coupled with a gate drive mechanism comprised of, for example, link mechanisms.

Positioned above the dispensing table assembly is a pair of generally funnel-shaped (or generally inverted conical) supply chutes 21 and 21 each aligned with the respective divided dispensing tables 6 and 6. These supply chutes 21 and 21 are supported above the machine body 4 by means of a transverse support member 23 and a plurality of upright support poles generally identified by 22 and fixed on the machine body 4 so as to extend perpendicular to the transverse support member 23.

In the combination weighing apparatus of the structure so far described, articles to be weighed that are supplied onto the dispensing tables 6 and 6 from above through the respective supply chutes 21 and 21 are fed towards the troughs 8 while the divided dispensing tables 6 and 6 are vibrated up and down by the respective vibrating mechanisms 5. The articles are then fed towards the pooling hoppers 9 by the respective vibrating mechanisms 7 and are eventually transported into the weighing hoppers 10 through the respective discharge ports of the pooling hoppers 9. The articles to be weighed within the weighing hoppers 10 are weighed so that a combination calculation can be performed using the weights of the articles measured respectively within the weighing hoppers 10 in such a way as to select an optimum combination of articles in which the sum of the measured weights of those articles meets or closely approximate to a target weight or number.

Thereafter, the respective gates 10a of some of the weighing hoppers 10 then accommodating the weighed articles having given rise to the optimum combination are opened by the gate drive mechanism to allow those articles to be discharged downwardly onto some of the guide chutes 11 associated with such some of the weighing hoppers 10. The articles so discharged slide downwardly through the guide chutes 11 towards the collecting chutes 12 and 12 and then into the common collecting hopper. After the articles have been temporarily stored within the common collecting hopper, they are discharged onto a plurality of delivery devices (not shown) downstream of the collecting hopper and then onto a bagging and/or packaging machine (not shown) in a manner well known those skilled in the alt.

Since the present invention is directed to the details of the dispensing table assembly which has been described as comprised of the divided dispensing tables 6 and 6, the details thereof will now be discussed.

[First Embodiment]

Figure 2:
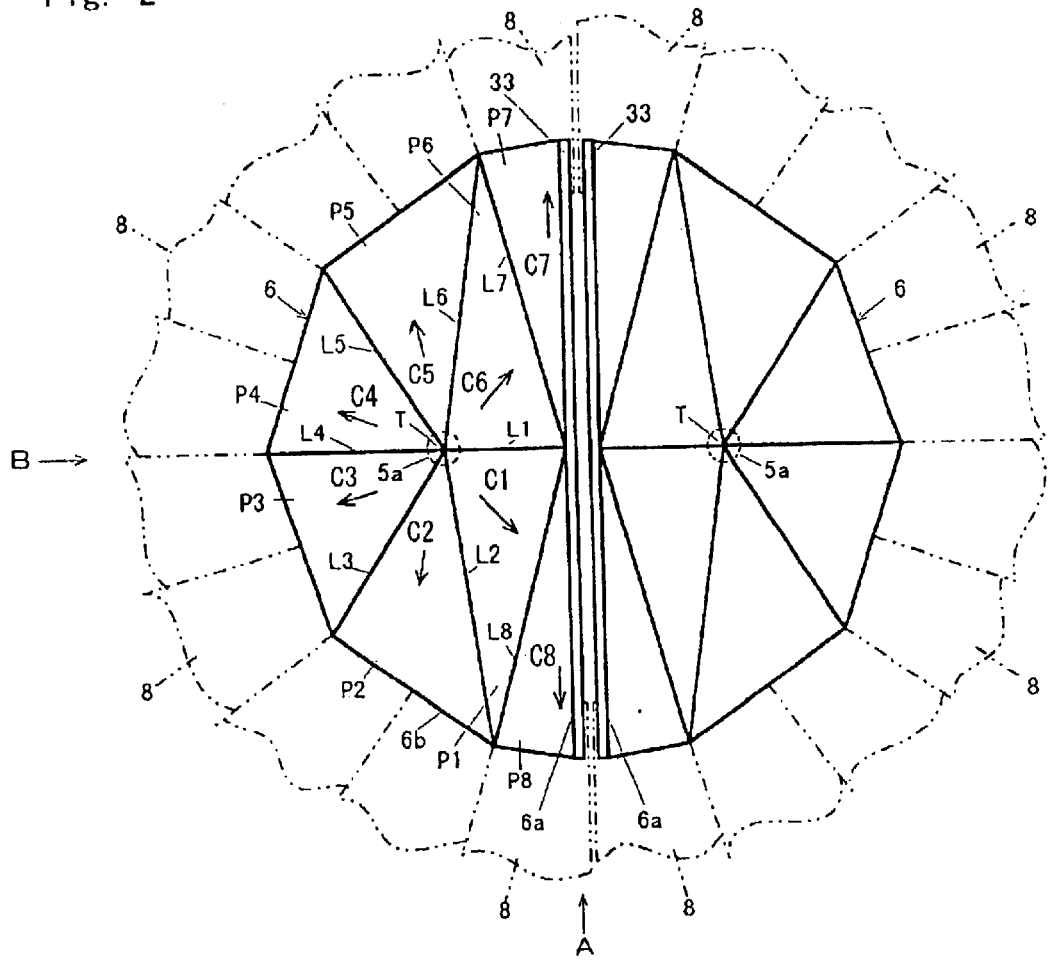
FIG. 2 is a top plan view of a dispensing table assembly employed in the combination weighing apparatus according to a first preferred embodiment of the present invention.
Figure 3:
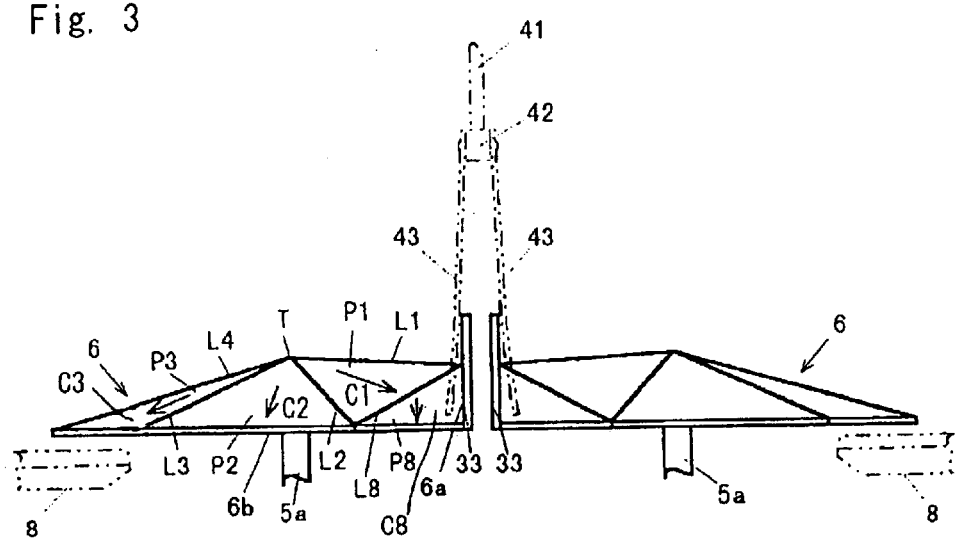
FIG. 3 is a side view of the dispensing table assembly as viewed in a direction shown by the arrow A in FIG. 2.
Figure 4:
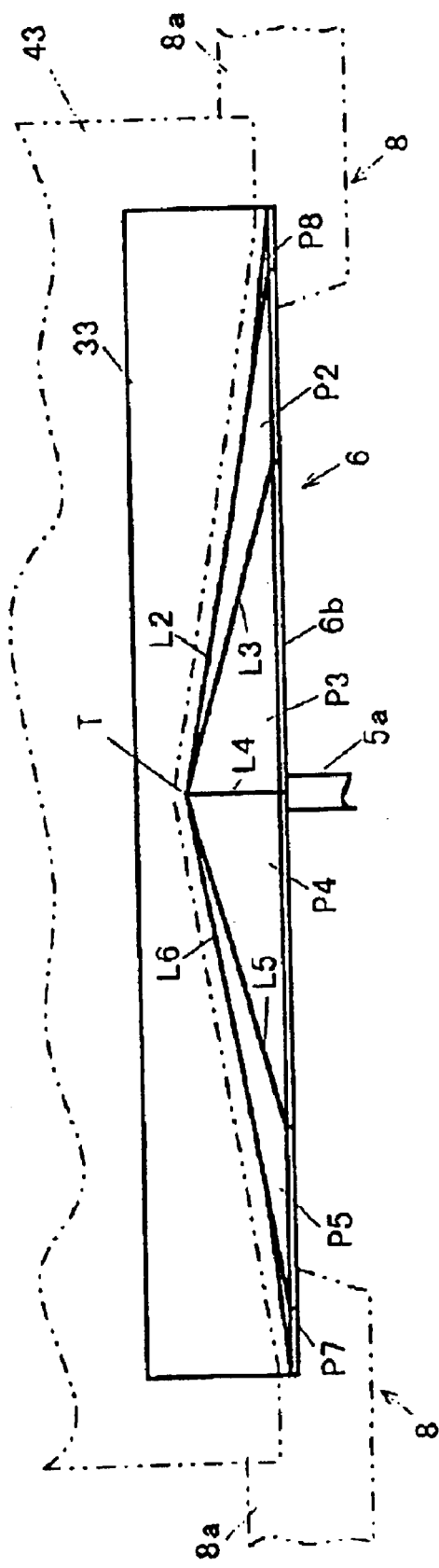
FIG. 4 is a side view of the dispensing table assembly as viewed in a direction shown by the arrow B in FIG. 2.

Referring particularly to FIGS. 2 to 4, the dispensing table assembly discussed hereinbefore is of a generally round configuration when viewed from top and is substantially divided into two halves, that is, the dispensing tables 6 and 6 along a dividing line drawn to extend across the geometric center of the round shape generally assumed by the dispensing table assembly. As clearly shown in FIG. 2 as viewed from top, division of the dispensing table assembly along the dividing line leaves a divided straight edge or a cut edge 6a in each of the resultant dispensing tables 6 and 6 while each of the dispensing tables 6 and 6 represents a generally sector shape.

As clearly shown in FIGS. 2 and 3, each of the dispensing tables 6 and 6 has a distributing point T defined at a location distant from the associated divided straight edge 6a and protruding upwardly from a level flush with a generally sector shaped peripheral edge 6b, so that the articles supplied onto the respective dispensing table 6 from above through the aligned supply chute 21 can be distributed generally radially outwardly from the distributing point T. In practice, each of the dispensing tables 6 and 6 is prepared from a flat metal plate first cut to a predetermined shape and then bent along bending lines L2, L3, L4, L5 and L6 to form a mountain fold and again bent along bending lines L7 and L8 to form a valley fold, with cut edges L1 and L1 finally jointed together by the use of, for example, a welding technique.

Thus, each of the dispensing tables 6 and 6 has eight inclined flat surface areas P1, P2, P3, P4, P5, P6, P7 and P8 of a generally triangular shape delimited by those bending lines L1 to L8 and inclined downwardly from the distributing point T towards the sector shaped peripheral edge 6b. A partition wall 33 is secured to the divided straight edge 6a of each of the dispensing tables 6 and 6 so as to extend upright for preventing some of the articles falling onto one of the dispensing tables 6 and 6 from jumping or rolling onto the other of the dispensing tables 6 and 6. This partition wall 33 is fixed to the straight edge 6a and concurrently serves as a reinforcement effective to avoid bending or undulation of the straight edge 6a of each of the dispensing tables 6 and 6.

Of the eight inclined flat surface areas, the inclined flat surface area PI is so inclined downwardly from the corresponding distributing point T that the direction of inclination as defined by the direction normal to the line of intersection between the inclined flat surface area P1 and the geometric horizontal plane extends as indicated by the arrow c1. In other words, the articles successively falling onto the inclined flat surface area P1 can move towards the partition wall 33 in the direction of the arrow c1. The inclined flat surface area P6 that is symmetrical to the inclined flat surface area P1 with respect to the joint L1 has the direction of inclination indicated by the arrow c6 and does therefore serve to guide the articles successively falling thereon so as to move towards the partition wall 33 in the direction of the arrow c6.

While the dispensing tables 6 and 6 are positioned relative to each other with the respective partition walls 33 and 33 spaced a slight distance from each other in parallel relation to each other as clearly shown in FIG. 2, each of the dispensing tables 6 and 6 is so supported and so disposed that the mountain folds, that is, the bending lines L2, L3, L4, L5 and L6 are generally aligned with respective boundaries each defined between the neighboring troughs 8. While each of the inclined flat surface areas P2 to P5 is positioned immediately above respective radially inward ends of two troughs 8 in alignment therewith, each of the inclined flat surface areas P7 and P8 is positioned immediately above respective radially inward end of one trough 8 in alignment therewith. So to speak, the number of the troughs 8 employed corresponds to the total number of the flat inclines surface areas P1 to P8 of the dispensing table assembly and those troughs 8 have their radially inward ends so positioned as to receive the articles moving along the associated inclined flat surface areas P1 to P8.

As discussed above, since each of the dispensing tables 6 and 6 is prepared from the metal plate by the use of any known bending work or a press work so as to have any desired number of flat surface areas, each of the dispensing tables 6 and 6 can have discrete guide slopes that can be easily aligned with the respective trough 8. These discrete guide slopes of the dispensing table assembly, that is, the inclined flat surface areas of the dispensing tables 6 and 6 provide optimum guide surfaces effective to facilitate generally uniform dispensing of the articles to be weighed and, therefore, the possibility can generally be avoided that one or some of the articles falling onto and traveling along one of the discrete guide slopes apparently towards a particular trough 8 aligned with such one of the guide slopes will move onto the next adjacent guide slope. Thus, the dispensing table assembly of the particular configuration so tailored in the manner described above is effective to avoid any possible biasing of the articles being dispensed.

Also, considering that the distributing points T and T in the respective dispensing tables 6 and 6 are defined at the locations each spaced a distance from the divided straight edges 6a and 6a, respectively, it has now become possible to position the supply chutes 21 and 21 immediately above the distributing points T and T with their centers of discharge aligned with those distributing points T and T, respectively, as clearly shown in FIG. 1. In other words, the supply chutes 21 and 21 have their longitudinal axes shown by X and X in FIG. 1 and are positioned immediately above the associated dispensing tables 6 and 6 with the longitudinal axes X and X aligned respectively with the distributing points T and T, so that the articles to be weighed that emerge downwardly from the supply chutes 21 and 21 can fall downwardly towards the distributing points T and T. By so doing, the articles to be weighed can be more uniformly distributed towards the respective sector shaped peripheral edges 6b of the dispensing tables 6 and 6. It is to be noted that although not shown each of the supply chutes 21 and 21 is supported for adjustment in a direction conforming to the longitudinal axis X thereof by means of a drive device so that the respective supply chute 21 can be adjusted in position to achieve an optimum dispensing of the articles onto the associated dispensing table 6. It is also to be noted that the centers of discharge of the supply chutes 21 and 21 referred to above lie in and are represented by the corresponding longitudinal axes X and X, respectively, as shown in FIG. 1.

Since according to the present invention the two supply chutes 21 and 21 can be positioned with their center of discharge separated from each other, each of the supply chutes 21 and 21 can have a size increased in a direction radially thereof and, therefore, in the illustrated embodiment, each of the supply chutes 21 and 21 have a top opening increased in size while representing a generally inverted conical shape. Accordingly, as compared with a supply chute in which only a lateral portion of the top opening thereof, namely, a left side portion of the supply chute 21 on the left in FIG. 1 or a right side portion of the supply chute 21 on the right in FIG. 1, can be increased in size in a lateral direction, each supply chute 21 and 21 employed in the present invention can have the top opening positioned at a relatively low level and, therefore, the space for installation can be minimized advantageously.

Referring particularly to FIGS. 1 and 3, the transverse support member 23 carrying the supply chutes 21 and 21 has an intermediate portion defined between the supply chutes 21 and 21, and a depending support member 41 is rigidly secured to such intermediate portion of the transverse support member 23 so as to extend downwardly therefrom. A lower free end of the depending support member 41 has an anchor brace 42 secured to a lower end thereof. A shield sheet 43 employed for each of the dispensing tables 6 and 6 is removably connected at one side edge to the anchor brace 42 and has the opposite side edge held in contact with each of the partition wall 33. These shield sheets 43 serve to prevent some of the articles discharged from one of the supply chutes 21 and 21 and falling onto one of the dispensing tables 6 and 6 from falling onto the other of the dispensing tables 6 and 6 and, hence, from mixing with the articles discharged from the other of the supply chutes 21 and 21. It is to be noted that in view of the fact that the dispensing tables 6 and 6 are vibrated up and down as hereinbefore described, these shield sheets 43 and 43 are not held tight, but have their inner surfaces slidably held in contact with respective inner surfaces of the partition walls 33 and 33.

Of the plural troughs, each of the four troughs 8 positioned adjacent and closest to the respective partition walls 33 and 33 has a side wall 8a adjacent the corresponding partition wall 33 that is chosen to have a height greater than the respective side walls of the other troughs 8 so as to stand between the partition walls 33 and 33 as shown in FIGS. 2 and 4, to thereby prevent some of the articles then falling onto the trough 8 associated with one of the dispensing tables 6 and 6 from falling onto the next adjacent trough 8 closest to the other partition wall 33 and associated with the other of the dispensing tables 6 and 6.

With the dispensing table assembly so designed as hereinabove described, the vibrating mechanisms 5 and 5 referred to hereinbefore are so arranged and so positioned that vibrating centers thereof, that is, respective vibrating shafts 5a and 5a of the vibrating mechanisms 5 and 5 and respective centers of gravity of the dispensing tables 6 and 6 are aligned with each other and also with the longitudinal axes X and X of the supply chutes 21 and 21 as best shown in FIG. 1. This is particularly advantageous in that since the dispensing tables 6 and 6 can be vibrated stably with vibrating forces transmitted to their centers of gravity receiving, a uniform dispensing of the articles to be weighed on the dispensing table assembly can be achieved.

As hereinbefore discussed, the vibrating mechanisms 5 and 5 are used to vibrate the respective divided dispensing tables 6 and 6 in a direction up and down. Accordingly, even though some of the articles being dispensed on the dispensing table assembly collide with the partition walls 33 and 33, a component of force tending to repel those articles in a direction away from the partition walls 33 and 33 towards the sector shaped peripheral edges 6b is minimal and, therefore, the possibility can be suppressed that the amount or number of the articles to be weighed which would remain adjacent the partition walls 33 and 33 may be small.

Hereinafter, the operation of the combination weighing apparatus 1 will be discussed. It is to be noted that since the dispensing tables 6 and 6 are of the same configuration and function in the same manner, in the following description reference will be made to only one of the dispensing tables, that is, the left dispensing table 6.

Assuming that the articles to be weighed are supplied from the supply chute 21 immediately above the left dispensing table 6 so as to fall towards the distributing point T of such dispensing table 6, the articles so supplied onto the dispensing table 6 then vibrated up and down by the corresponding vibrating mechanism 5 are substantially uniformly distributed from the distributing point T towards the inclined flat surface areas P1, P2, P3, P4, P5 and P6 of the dispensing table 6 in respective directions shown by the arrows c1, c2, c3, c4, c5 and c6. As a matter of course, since the dispensing table 6 is vibrated up and down by the vibrating mechanism 5, the articles on those inclined flat surface areas of the dispensing table 6 are positively guided downwardly towards the associated troughs 8.

In such case, the articles to be weighed which have been dispensed on, for example, the inclined flat surface areas P1 and P6 move therealong towards the associated inclined flat surface areas P8 and P7 past the valley folds L8 and L7, respectively. Since the direction of inclination of each of those flat surface areas P8 and P7 is different from that of each of the flat surface areas P1 and P6, the articles having just moved into the flat surface areas P8 and P7 are then deflected so as to move in respective directions shown by the arrows c8 and c7 along the flat surface areas P8 and P7 before they reach the corresponding troughs 8 and 8 that are positioned immediately below and in alignment with the flat surface areas P8 and P7 through associated portions of the sector shaped peripheral edge 6b of the dispensing table 6. Since the flat surface areas P1 and P6 are inclined upwardly relative to the adjacent flat surface areas P8 and P7, the articles to be weighed once dispensed onto the flat surface areas P8 and P7 in the manner described above will neither stagnate at the flat surface areas P1 and P6 even though they attempt to move towards the flat surface areas P1 and P6, nor be distributed over the flat surface area P2 and P5 past the lines L2 and L6.

Accordingly, there is no possibility that the amount or number of the articles to be weighed which have distributed onto the flat surface areas P8 and P7 and approached the adjacent partition wall 33 will not decrease, and the articles so distributed can assuredly fall onto the associated troughs 8 and 8 below the flat surface areas P8 and P7.

Also, since as discussed hereinbefore the vibrating mechanism 5 associated with the left dispensing table 6 vibrates the dispensing table 6 up and down repeatedly, collision of some of the articles with the adjacent partition wall 33 will not result in repelling those articles in a direction towards the sector shaped peripheral edge 6b of the dispensing table 6 because the component of force acting to repel the articles in such direction is minimal. Accordingly, reduction in amount or number of the articles to be weighed in the vicinity of the adjacent partition wall 33 can advantageously be suppressed.

Even though a vibrating mechanism of a kind effective to vibrate the dispensing table 6 in a circumferential direction as well as a vertical direction achieved by the vibrating mechanism 5 discussed above is employed and some of the articles to be weighed would be, after having collided with the partition wall 33, repelled by the partition wall 33 so as to move towards the sector shaped peripheral edge 6b of the dispensing table 6, the provision of the flat surface areas P1 and P6 inclined downwardly towards the partition wall 33 are effective in that some of the articles to be weighed which have been repelled by the partition wall 33 can be again repelled by the flat surface areas P1 and P6 backwardly onto the adjacent flat surface areas P8 and P7 or fall along the flat surface areas P1 and P6 towards the partition wall 33. For this reason, the amount or number of the articles repelled by the partition wall 33 and moving in the vicinity of the partition wall 33 does not decrease.

Also, since the dispensing table 6 is prepared from the metal plate by the use of a bending technique, not only is the dispensing table 6 easy to manufacture, but the cost of manufacture thereof can also be reduced advantageously.

[Second Embodiment]

A second preferred embodiment of the present invention will now be described with particular reference to FIGS. 5 to 7. It is to be noted that even in this embodiment the dispensing table assembly is comprised of the two, generally sector shaped dispensing tables 56 and 56 having the same configuration and capable of performing the same function and, accordingly, only one of the sector shaped dispensing tables, that is, the left dispensing table 56 as used in the combination weighing apparatus of FIG. 1 will be described in detail for the sake of brevity.

The dispensing table assembly employed in the practice of the second embodiment of the present invention is of a generally round configuration when viewed from top and is substantially divided into two halves, that is, the dispensing tables 56 and 56 along a dividing line drawn to extend across the geometric center of the round shape generally assumed by the dispensing table assembly as is the case with that in the previously described embodiment. The dispensing table 56 referred to above and described in detail subsequently is of a generally sector configuration in plan view.

Figure 5:
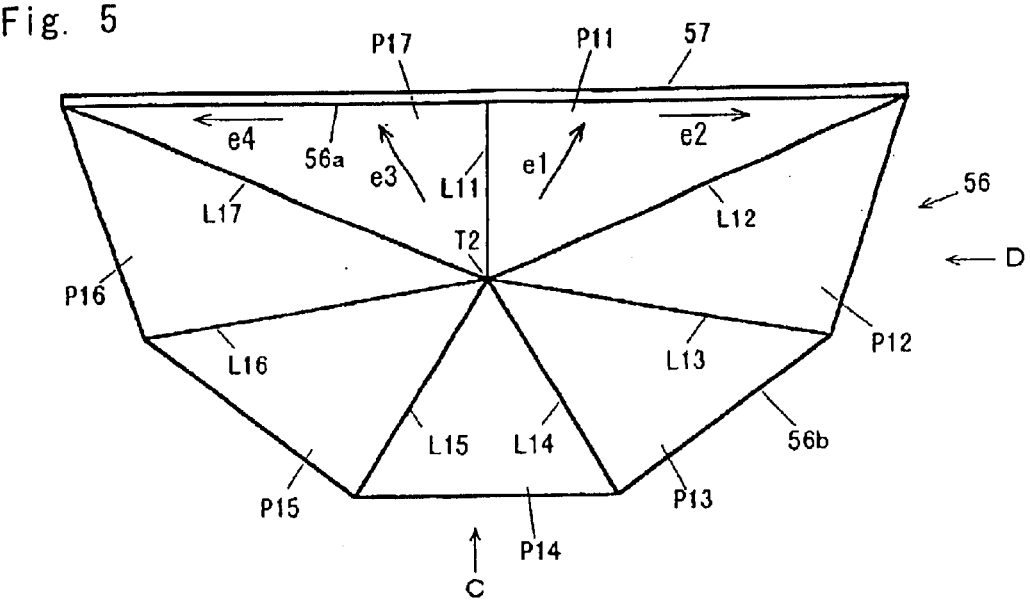
FIG. 5 is a fragmentary top plan view of one of halves of the dispensing table assembly employed in accordance with a second preferred embodiment of the present invention.
Figure 6:
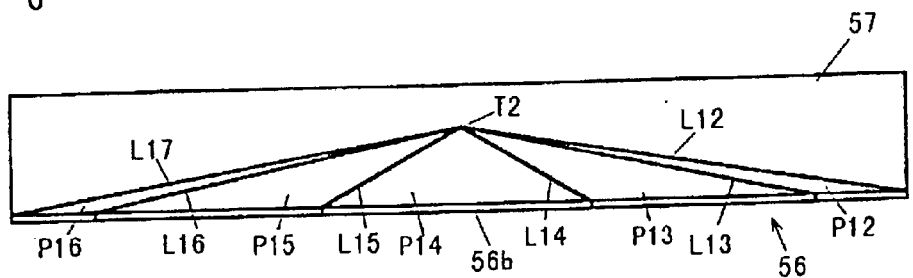
FIG. 6 is a side view of the dispensing table assembly as viewed in a direction shown by the arrow C in FIG. 5.
Figure 7:
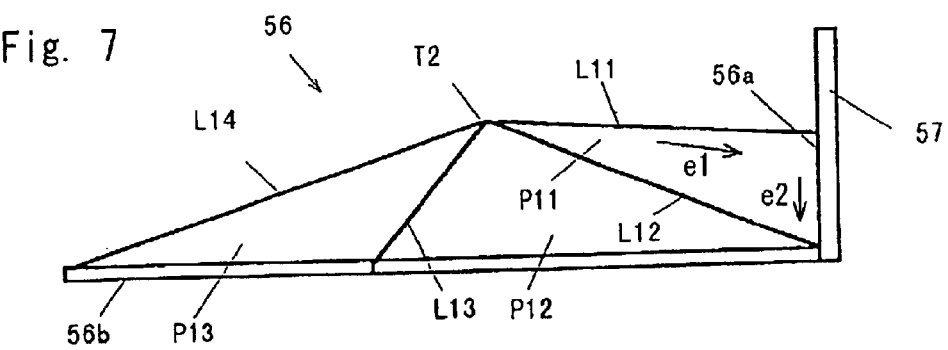
FIG. 7 is a side view of one of the halves of the dispensing table assembly as viewed in a direction shown by the arrow D in FIG. 5.

Referring now to FIGS. 5 to 7, the dispensing table 56 has a distributing point T2 defined at a location distant from the associated divided straight edge 56a and protruding upwardly from a level flush with a generally sector shaped peripheral edge 56b, so that the articles supplied onto the dispensing table 56 from above through the aligned supply chute 21 as shown in FIG. 1 can be distributed generally radially outwardly from the distributing point T2. In practice, the dispensing table 56 is prepared from a flat metal plate first cut to a predetermined shape and then bent along bending lines L12, L13, L14, L15, L16 and L17 to form a mountain fold with cut edges L11 and L11 jointed by the use of, for example, a welding technique.

Thus, the dispensing table 56 has seven inclined flat surface areas P11, P12, P13, P14, P15, P16 and P17 of a generally triangular shape delimited by those bending lines L11 to L17 and inclined downwardly from the distributing point T2 towards the sector shaped peripheral edge 56b. A partition wall 57 is secured to the divided straight edge 56a of the dispensing table 56 so as to extend upright for preventing some of the articles falling onto the dispensing table 56 from jumping or rolling onto the other dispensing table 56. This partition wall 57 is fixed to the divided straight edge 56a and concurrently serves as a reinforcement effective to avoid bending or undulation of the straight edge 56a of the dispensing table 56.

Of the seven inclined flat surface areas, each of the inclined flat surface areas P11 and P17 is so inclined downwardly from the distributing point T2 that the direction of inclination as defined by the direction normal to the line of intersection between each inclined flat surface area P11 and P17 and the geometric horizontal plane extends as indicated by the arrow e1 and e3. Accordingly, the articles to be weighed which have been supplied from the associated supply chute 21 onto the dispensing table 56 generally in alignment with the distributing point T2 can be generally uniformly distributed from the distributing point T2 towards the flat surface areas P11, P12, P13, P14, P15, P16 and P17 and then fall downwardly along those flat surface areas towards the sector shaped peripheral edge 56b. In such case, some of the articles to be weighed which have been distributed to the flat surface areas P11 and P17 are guided downwardly therealong in respective directions indicated by the arrows e1 and e3 towards the partition wall 57 and are subsequently deflected so as to move along the partition wall 57 in respective directions indicated by the arrows e2 and e4 before they reach the sector shaped peripheral edge 56b and then fall downwardly onto the associated troughs (not shown in FIGS. 5 to 7, but shown in, for example, FIG. 2).

Also, since the flat surface areas P11 and P17 are inclined upwardly relative to the partition wall 57, some of the articles once distributed onto the flat surface areas P11 and P17 will not ride over the mountain folds L12 and L17 and then onto the adjoining flat surface areas P12 and P16, respectively, but will ride over the lines L12 and L17 only in the vicinity of the sector shaped peripheral edge 56b. Accordingly, without the amount or number of the articles being reduced in the vicinity of the partition wall 57, the articles guided along the flat surface areas P11 and P17 can be positively dispensed onto the associated troughs positioned therebelow.

[Third Embodiment]

Figure 8:
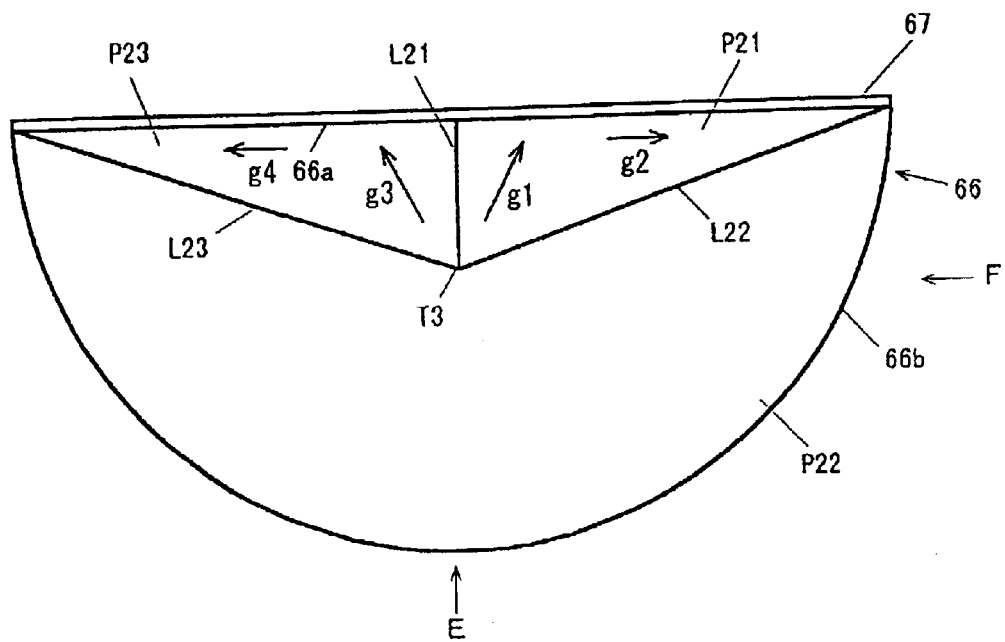
FIG. 8 is a top plan view of one of the halves of the dispensing table assembly employed in accordance with a third preferred embodiment of the present invention.
Figure 9:
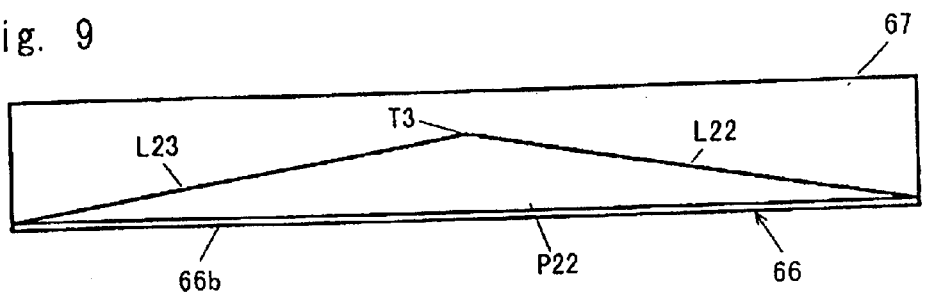
FIG. 9 is a side view of the dispensing table assembly as viewed in a direction shown by the arrow E in FIG. 8.
Figure 10:
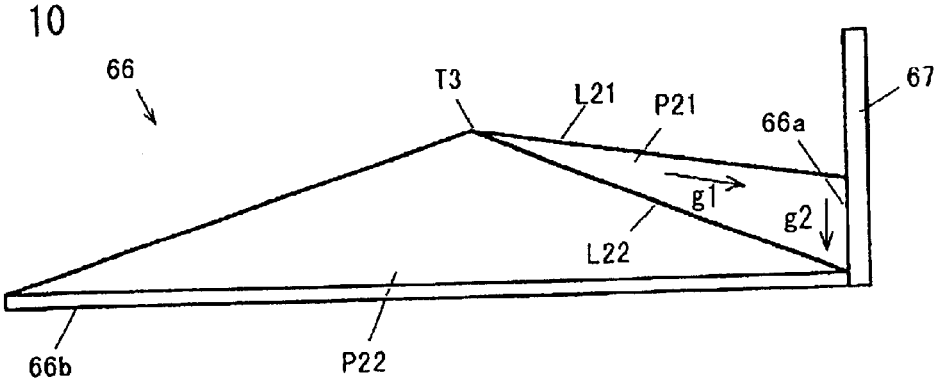
FIG. 10 is a side view of one of the halves of the dispensing table assembly as viewed in a direction shown by the arrow F in FIG. 8.

With reference to FIGS. 8 to 10, the dispensing table assembly according to a third preferred embodiment of the present invention will be described. As shown therein, the dispensing table assembly is of a generally round configuration when viewed from top and is substantially divided into two halves, that is, the dispensing tables 66 and 66 along a dividing line drawn to extend across the geometric center of the round shape generally assumed by the dispensing table assembly as is the case with that in the previously described embodiment. The dispensing table now identified by 66 is of a generally sector configuration in plan view.

The dispensing table 66 has a distributing point T3 defined at a location distant from the associated divided straight edge 66a and protruding upwardly from a level flush with a generally sector shaped peripheral edge 66b, so that the articles supplied onto the dispensing table 66 from above through the aligned supply chute 21 as shown in FIG. 1 can be distributed generally radially outwardly from the distributing point T3. Even the dispensing table 66 is prepared from a flat metal plate first cut to a predetermined shape and then bent along bending lines L22 and L23 to form a mountain fold with cut edges L21 and L21 jointed by the use of, for example, a welding technique after a flat surface region between the mountain folds L22 and L23 have been bent to represent a curved surface. Thus, this dispensing table 66 has three inclined surface areas P21, P22 and P23 delimited by those bending lines L21 to L23, each of these surface areas P21 to P23 being inclined downwardly towards the sector shaped peripheral edge 66b. A partition wall 67 is secured to the divided straight edge 66a of the dispensing table 66 so as to extend upright for preventing some of the articles falling onto the dispensing table 66 from jumping or rolling onto the other dispensing table 66. This partition wall 67 is fixed to the divided straight edge 66a and concurrently serves as a reinforcement effective to avoid bending or undulation of the straight edge 66a of the dispensing table 66.

Of the surface areas, the surface areas P21 and P23 are a flat surface area and so inclined downwardly from the distributing point T3 that the direction of inclination as defined by the direction normal to the line of intersection between each inclined flat surface area P21 and P23 and the geometric horizontal plane extends as indicated by the arrow g1 and g3. Accordingly, the articles to be weighed which have been supplied from the associated supply chute 21 onto the dispensing table 66 generally in alignment with the distributing point T3 can be generally uniformly distributed from the distributing point T3 towards the surface areas P21, P22 and P23 and then fall downwardly along those surface areas towards the sector shaped peripheral edge 66b. In such case, some of the articles to be weighed which have been distributed to the flat surface areas P21 and P23 are guided downwardly therealong in respective directions indicated by the arrows g1 and g3 towards the partition wall 67 and are subsequently deflected so as to move along the partition wall 67 in respective directions indicated by the arrows g2 and g4 before they reach the sector shaped peripheral edge 66b and then fall downwardly onto the associated troughs (not shown in FIGS. 8 to 10, but shown in, for example, FIG. 2).

Since each of the flat surface areas P21 and P23 raises upwardly from the partition wall 67, the articles to be weighed which have been distributed onto these flat surface areas P21 and P23 are not dispensed to the surface area P22 over the associated mountain folds L22 and L23 other than moving towards the peripheral edge 66b. Accordingly, the amount or number of the articles to be weighed that are positioned in the vicinity of the partition wall 67 will not decrease and they can assuredly fall onto the associated troughs through the flat surface areas P21 and P23.

[Fourth Embodiment]

A fourth preferred embodiment of the present invention will now be described with particular reference to FIGS. 11 to 13. The dispensing table assembly employed in the practice of the fourth embodiment of the present invention is of a generally round configuration when viewed from top and is substantially divided into two halves, that is, the dispensing tables 76 and 76 along a dividing line drawn to extend across the geometric center of the round shape generally assumed by the dispensing table assembly as is the case with that in any of the previously described embodiments. It is to be noted that even in this embodiment the dispensing table assembly is comprised of the two, generally sector shaped dispensing tables 76 and 76 having the same configuration and capable of performing the same function and, accordingly, only one of the sector shaped dispensing tables, that is, the left dispensing table 76 as used in the combination weighing apparatus of FIG. 1 will be described in detail for the sake of brevity.

Figure 11:
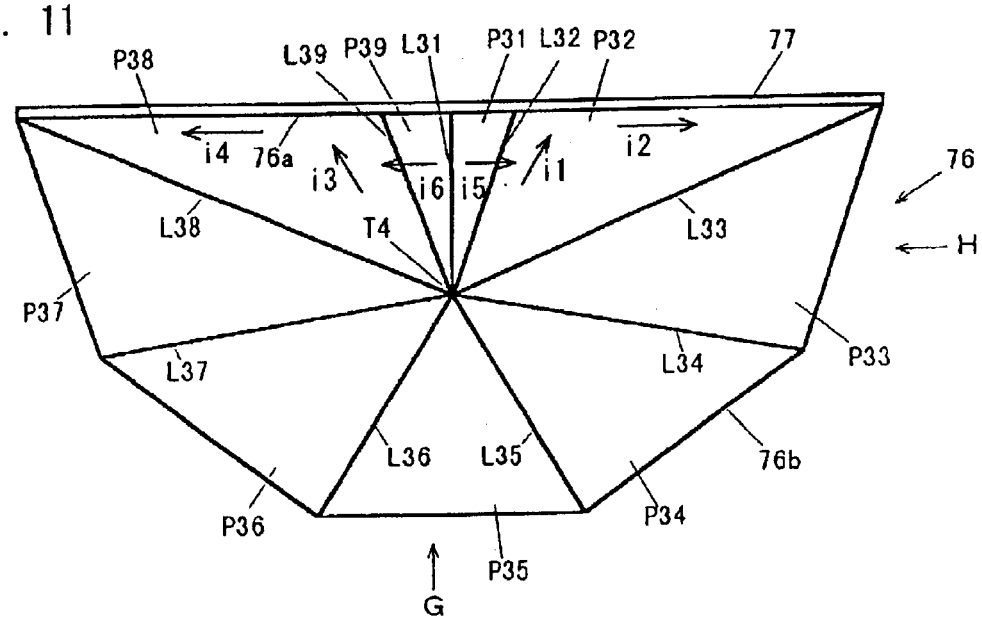
FIG. 11 is a fragmentary top plan view of one of the halves of the dispensing table assembly employed in accordance with a fourth preferred embodiment of the present invention.
Figure 12:
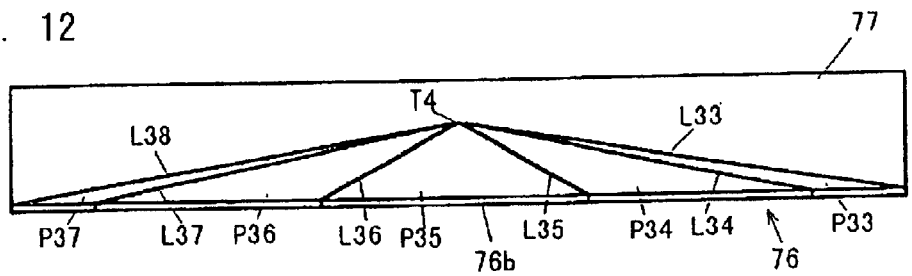
FIG. 12 is a side view of the dispensing table assembly as viewed in a direction shown by the arrow G in FIG. 11.
Figure 13:
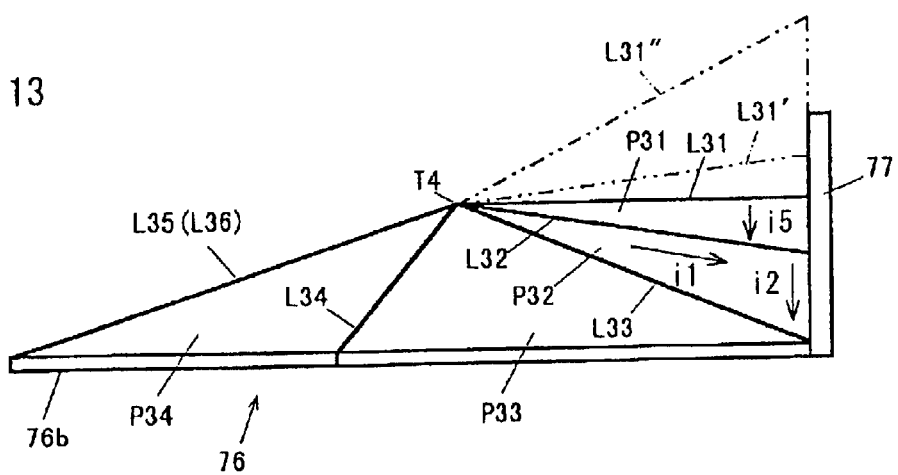
FIG. 13 is a fragmentary side view of one of the halves of the dispensing table assembly as viewed in a direction shown by the arrow H in FIG. 11.

As shown in FIGS. 11 to 13, the dispensing table 76 has a distributing point T4 defined at a location distant from the associated divided straight edge 76a and protruding almost diagonally upwardly from a level flush with a generally sector shaped peripheral edge 76b, so that the articles supplied onto the dispensing table 76 from above through the aligned supply chute 21 as shown in FIG. 1 can be distributed generally radially outwardly from the distributing point T4. In practice, the dispensing table 76 is prepared from a flat metal plate first cut to a predetermined shape and then bent along bending lines L33, L34, L35, L36, L37 and L38 to form a mountain fold and along bending lines L31 and L39 to form a valley fold with cut edges L31 and L31 jointed together by the use of, for example, a welding technique. Thus, the dispensing table 76 has nine inclined flat surface areas P31, P32, P33, P34, P35, P36, P37, P38 and P39 of a generally triangular shape delimited by those bending lines L31 to L39 and inclined downwardly from the distributing point T4 towards the sector shaped peripheral edge 76b. A partition wall 77 is secured to the divided straight edge 76a of the dispensing table 76 so as to extend upright for preventing some of the articles falling onto the dispensing table 76 from jumping or rolling onto the other dispensing table 76. This partition wall 57 is fixed to the divided straight edge 76a and concurrently serves as a reinforcement effective to avoid bending or undulation of the straight edge 76a of the dispensing table 76. In addition, the line 31 forms an edge line horizontally extending from the distributing point T4 to the partition wall 77.

Of the nine inclined flat surface areas P31 to P39, each of, for example, the inclined flat surface areas P32 and P38 is so inclined downwardly from the distributing point T4 that the direction of inclination as defined by the direction normal to the line of intersection between each inclined flat surface area P32 and P38 and the geometric horizontal plane extends as indicated by the arrow i1 and i3. Also, the inclined flat surface areas P31 and P39 are so inclined that the articles are guided in the respective directions indicated by the arrows i5 and i6. Accordingly, the articles to be weighed which have been supplied from the associated supply chute 21 onto the dispensing table 76 generally in alignment with the distributing point T4 can be generally uniformly distributed from the distributing point T4 towards the flat surface areas P31, P32, P33, P34, P35, P36, P37, P38 and P39 and then fall downwardly along those flat surface areas towards the sector shaped peripheral edge 76b. In such case, some of the articles to be weighed which have been distributed to, for example, the flat surface areas P32 and P38 are guided downwardly therealong in respective directions indicated by the arrows i1 and i3 towards the partition wall 77 and are subsequently deflected so as to move along the partition wall 77 in respective directions indicated by the arrows i2 and i4 before they reach the sector shaped peripheral edge 76b and then fall downwardly onto the associated troughs (not shown in FIGS. 11 to 13, but shown in, for example, FIG. 2). Similarly, some of the articles to be weighed which have been distributed to the flat surface areas P31 and P39 are guided downwardly therealong in respective directions indicated by the arrows i5 and i6 towards the flat surface areas P32 and P38, that are inclined at respective angles different from those of inclination of the flat surface areas P31 and P39, and are subsequently guided in the manner described hereinabove.

Also, since the inclined flat surface areas P32 and P38 are inclined to raise upwardly relative to the base edge of the partition wall 77, some of the articles once distributed onto the flat surface areas P32 and P38 will not ride over the mountain fold L33 and L38 and then onto the adjoining flat surface areas P33 and P37, respectively, but are only guided towards respective portions of the sector shaped peripheral edge 77b aligned with the troughs associated with such flat surface areas P32 and P38. Accordingly, without the amount or number of the articles being reduced in the vicinity of the partition wall 77, the articles guided along the flat surface areas P32 and P38 can be positively dispensed onto the associated troughs positioned therebelow.

It is to be noted that although in the fourth embodiment described above, the joint between the cut edges L31 and L31 extends substantially horizontally between the distributing point T4 and the partition wall 77 as clearly shown in FIG. 13, this joint between the cut edges L31 and L31 may be so designed as to extend upwardly towards the partition wall 77 as shown by the phantom line L31' in FIG. 13. Even this alternative design can bring about similar effects to those brought about when the joint between the cut edges L31 and L31 extends substantially horizontally, since some of the articles falling onto the surface area P31 can move onto the flat surface area P32.

Also, as shown by the phantom line L31", the joint between the cut edges L31 and L31 may extend to a position where one end of the joint adjacent the partition wall 77 terminates at a level higher than the level of the distributing point T4. Even this alternative design can bring about similar effects to those brought about when the joint between the cut edges L31 and L31 extends substantially horizontally, since some of the articles falling onto the surface area P31 can move onto the flat surface area P32.

In other words, the distributing point may be defined at any level provided that the articles to be weighed that are supplied onto the dispensing table can be distributed in all directions about the distributing point and may, therefore may not necessarily be defined at the highest level

[Fifth Embodiment]

Figure 15:
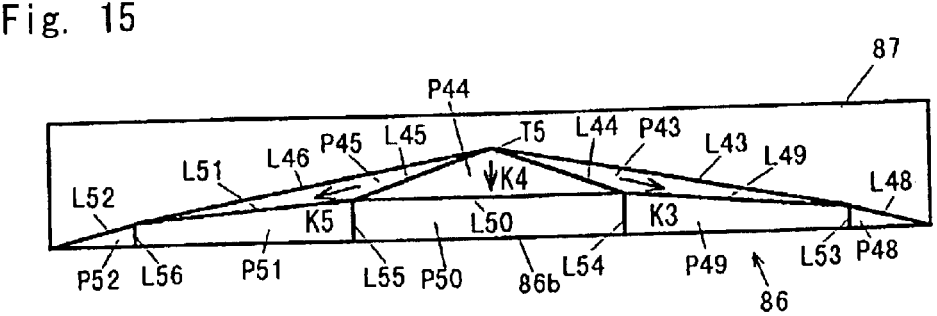
FIG. 15 is a side view of the dispensing table assembly as viewed in a direction shown by the arrow I in FIG. 14.
Figure 16:
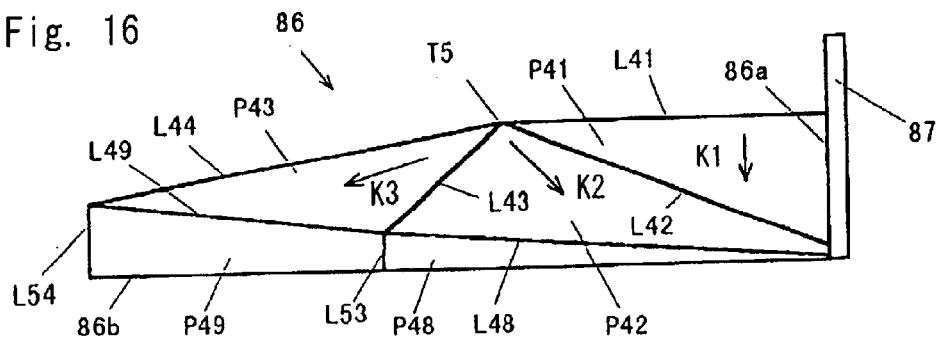
FIG. 16 is a fragmentary side view of one of the halves of the dispensing table assembly as viewed in a direction shown by the arrow J in FIG. 14.

A fifth preferred embodiment of the present invention will hereinafter be described with particular reference to FIGS. 14 to 16. The dispensing table 86 employed in this fifth embodiment is generally similar to that according to the second embodiment shown in and described with reference to FIGS. 5 to 7, but differs therefrom in that in the fifth embodiment the flat surface areas P11 to P17 of the dispensing table 56 of the second embodiment are modified to have a substantially equal angle of inclination with respect to each other and the joint between the cut edges L11 and L11 of the second embodiment is modified to extend substantially horizontally. This dispensing table 86 so far as viewed in a plan is substantially identical in shape to that of the dispensing table 56 employed in the previously described second embodiment.

More specifically, the dispensing table assembly employed in the practice of the fifth embodiment of the present invention is of a generally round configuration when viewed from top and is substantially divided into two halves, that is, the dispensing tables 86 and 86 along a dividing line drawn to extend across the geometric center of the round shape generally assumed by the dispensing table assembly as is the case with that in any of the previously described embodiments. It is to be noted that even in this embodiment the dispensing table assembly is comprised of the two, generally sector shaped dispensing tables 86 and 86 having the same configuration and capable of performing the same function and, accordingly, only one of the sector shaped dispensing tables, that is, the left dispensing table 86 as used in the combination weighing apparatus of FIG. 1 will be described in detail for the sake of brevity. As shown in FIGS. 14 to 16, the dispensing table 86 has a distributing point T5 defined at a location distant from the associated divided straight edge 86a and protruding upwardly from a level flush with a generally sector shaped peripheral edge 86b, so that the articles supplied onto the dispensing table 86 from above through the aligned supply chute 21 as shown in FIG. 1 can be distributed generally radially outwardly from the distributing point T5.

This dispensing table 86 is prepared from a flat metal plate first cut to a predetermined shape and then bent along bending lines L43, L44, L45 and L46 to form a mountain fold and also along bending lines L42 and L47 to form a valley fold with cut edges L41 and L41 jointed by the use of, for example, a welding technique. Thus, the dispensing table 56 has seven inclined flat surface areas P41, P42, P43, P44, P45, P46 and P47 of a generally triangular shape delimited by those bending lines L42 to 47 and inclined downwardly from the distributing point T5 towards the sector shaped peripheral edge 86b. The flat surface areas P42 to P46 have their outer peripheral edge portions bent downwardly to define respective upright walls P48, P49, P50, P51 and P52 continued respectively from the flat surface areas P42 to P46, with side cut edges L53 and L53, L54 and L54, L55 and L55, L56 and L56 of the neighboring upright walls being jointed together to define a corresponding joint by means of, for example a welding technique. A partition wall 87 is secured to the divided straight edge 86a of the dispensing table 86 so as to extend upright for preventing some of the articles falling onto the dispensing table 86 from jumping or rolling onto the other dispensing table 86. This partition wall 87 is fixed to the divided straight edge 86a and concurrently serves as a reinforcement effective to avoid bending or undulation of the straight edge 86a of the dispensing table 86.

Of the seven inclined flat surface areas, the flat surface areas P42 to P46 have an equal angle of inclination, i.e., are inclined at an equal angle downwardly from the distributing point T7 towards the peripheral edge 86b. In other words, the line of intersection between each of the flat surface areas P42 to p46 and the horizontal plane including respective outer edges of the bending lines L42 and L47 represents a polygonal shape as shown by X in FIG. 14 with its apex lying on the imaginary circle Y with its center aligned with the distributing point T5 and, therefore, the direction of inclination of each of those flat surface areas P42 to P46 lines in a direction from the distributing point T5 towards the peripheral edge 86b excluding the divided straight edge 86a, more specifically in a direction intermediate of the intervening angle between the neighboring mountain folds L42 to L47, that is, in a respective direction shown by the arrow k2, k3, k4, k5 and k6 in FIG. 14.

In other words, in the dispensing table 86 according to this fifth embodiment, of the flat surface areas P41 to P47, the flat surface areas P42 and P46 are inclined downwardly from the distributing point T5 towards the partition wall 87 and the direction of inclination thereof, that is, the direction normal to the line of intersection between each of the flat surface areas P42 and P46 and the horizontal plane lies in the direction shown by the respective arrow k2 and k6. Each of the flat surface areas P41 and P47 neighboring the flat surface areas P42 and P46, respectively, and adjoining the partition wall 87 has one side represented by the joint between the cut edges L41 and L41 that extends horizontally and, accordingly, the direction of inclination thereof lie in a direction shown by the arrow k1 and k7, that is, in a direction parallel to the partition wall 87.

According to this embodiment, the articles to be weighed that are supplied from the associated hopper 21 onto the dispensing table 86 generally in alignment with the distributing point T5 are generally uniformly distributed from the distributing point T5 generally uniformly onto the flat surface areas P41, P42, P43, P44, P45, P46 and P47 so as to move in the respective directions shown by the arrows k1, k2, k3, k4, k5, k6 and k7. In such case, some of the articles distributed onto the flat surface areas P42 and P46 move downwardly therealong in the respective directions shown by the arrows k2 and k6 and also into the vicinity of the partition wall 87 and subsequently fall onto the associated troughs (not shown) from the corresponding portions of the peripheral edge 86b of the dispensing table 86.

Also, some of the articles falling onto the flat surface areas P41 and P47 move downwardly in the respective directions indicated by the arrows k1 and k7 and over the respective mountain folds L42 and L47 onto the flat surface areas P42 and P46. However, considering that the flat surface areas P42 and P46 are raised to slope upwardly from the partition wall 87 with their direction of inclination lying in the respective directions k2 and K6, such some of the articles to be weighed which have moved onto the flat surface areas P42 and P46 in the manner described above are forced to move downwardly in the associated directions shown by the arrows k2 and k6 and are therefore sufficiently dispensed towards the vicinity of the partition wall 87. Accordingly, there is no possibility of the amount of the articles in the vicinity of the partition wall 87 being reduced and the articles to be weighed can be assuredly supplied onto the troughs positioned immediately below the flat surface areas P41 and P47.

Also, since the flat surface areas P41 to P47 have the substantially same angle of inclination from the distributing point T5 downwardly towards the peripheral edge 86b of the dispending table 86, there is no possibility that a substantial amount or number of the articles to be weighed may be biased in one or some of the flat surface areas of a relatively large angle of inclination and/or that some of the articles supplied onto one or some of the flat surface areas of a relatively large angle of inclination may flow onto the troughs immediately below such one or some of the flat surface areas at one push and, therefore, the articles to be weighed can be advantageously dispensed substantially uniformly onto the troughs.

In addition, since the joint between the cut edges L41 and L41 lies horizontally, each of the flat surface areas P41 and P47 having its one side defined by such joint extends perpendicular to the partition wall 87. According to this feature, the flat surface areas P41 and P47 incline in respective directions shown by the arrows k1 and k7, that is, in the respective directions parallel to the partition wall 87. Accordingly, there is no possibility that some of the articles dispensed from the inclined flat surface areas P42 and P46, that are inclined downwardly towards the partition wall 87, onto the flat surface areas P41 and P47, respectively, will be so urged towards the partition wall 87 and may therefore stagnate in the vicinity of the partition wall 87 without being smoothly moved towards the peripheral edge 86b, and they can therefore move smoothly towards the peripheral edge 86b of the dispensing table 86.

Figure 14:
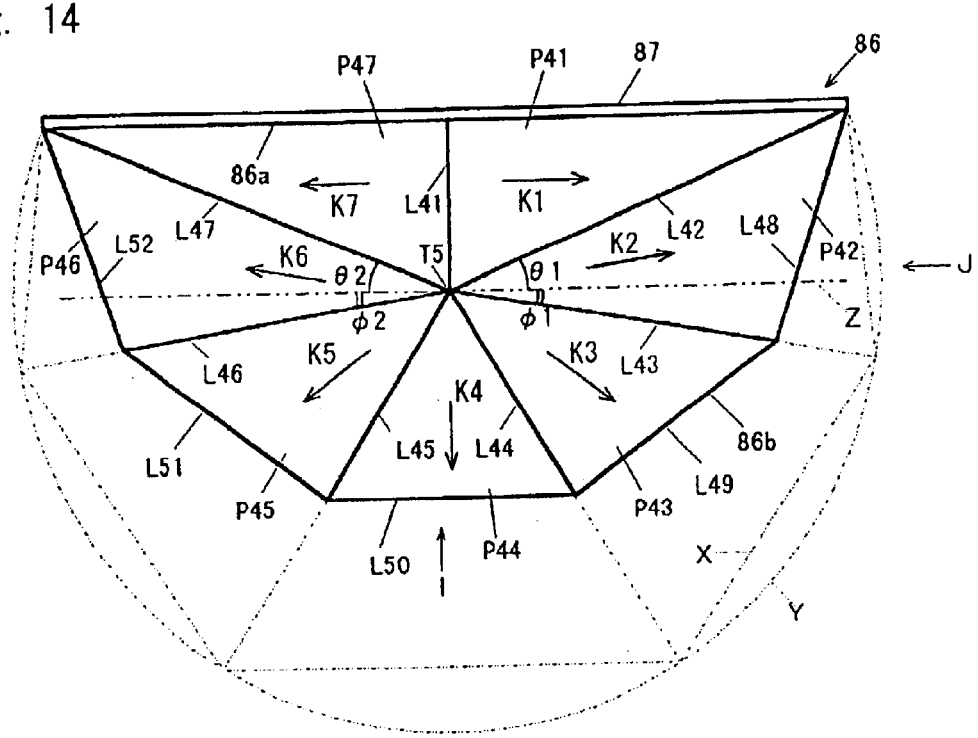
FIG. 14 is a fragmentary top plan view of one of the halves of the dispensing table assembly employed in accordance with a fifth preferred embodiment of the present invention.

It is to be noted that in this fifth embodiment, in order to render the flat surface areas P42 and P46 to be inclined downwardly from the distributing point T5 towards the partition wall 87, the intervening angle θ1 and θ2 delimited between each of the mountain folds L42 and L47 and the imaginary line Z parallel to the partition wall 87 and drawn to extend across the distributing point T5 as shown in FIG. 14 has to be of a value greater than the intervening angle φ1 and φ2 delimited between each of the mountain folds L43 and L46 and the imaginary line Z.

[Other Alternatives]

In describing any one of the first to fifth embodiments of the present invention, the dispensing table assembly has been shown and described as divided into two dispensing tables. However, the number of divisions of the dispensing table assembly may not be always limited to two, but may be more than two, for example, three or four and even in such case the present invention can work satisfactorily. Also, when the dispensing table assembly is to be divided, division may not be made equal and, specifically, the dispensing table assembly may be divided into, for example, two dispensing tables and one of the dispensing tables may further be divided into two halves so that the dispensing table assembly as a whole can be made up of three dispensing tables having 50%, 25% and 25% in size, respectively. According to this alternative feature, a plurality of the articles to be weighed can be handled according to the amount of the articles to be handled by each of those dispensing tables.

Although not shown, it is possible to provide inclined surface areas by cutting a portion of a conical table in a direction parallel to the diametric direction thereof or in a direction longitudinally thereof and securing a partition wall to a cut end edge thereof so that the resultant surface area can incline downwardly from the apex (i.e., the distributing point) towards the partition wall. In other words, while in the dispensing tables employed in any one of the first to fifth embodiment described hereinbefore the flat surface areas that are inclined downwardly towards the partition wall occupy a portion of flat surface areas divided by a plurality of the bending lines, it is possible to define the surface areas that incline downwardly towards the partition wall without bending being effected along each bending line. In such case, it may be regarded that surface areas exist in an indefinite number.

Also, for the dispensing tables employable in the present invention, the dispensing tables shown as employed in any one of the first to fifth embodiments can be employed in combination with any suitable dispensing table of a different shape. According to this alternative feature, where different kinds of articles to be weighed are mixed and are then to be weighed, and where the different kinds of the articles have differing dispersibility, utilization of the dispensing tables optimum to the articles of the different kinds makes it possible for the articles to be assuredly dispensed uniformly.

Figure 17:
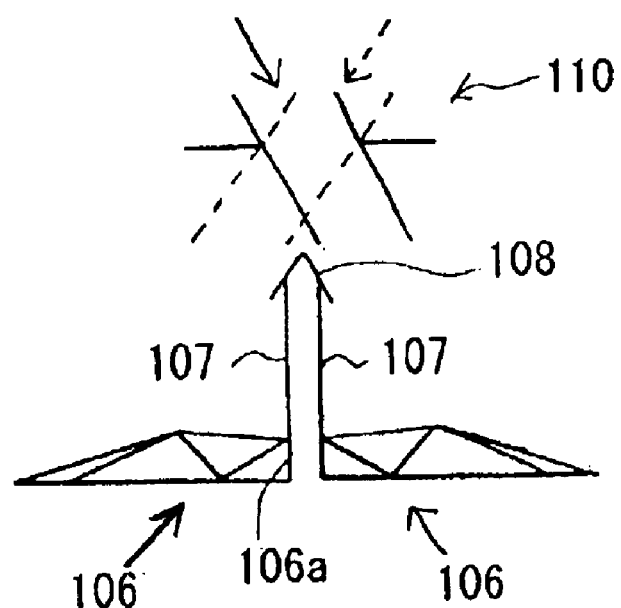
FIG. 17 is a schematic side view of a modified form of the combination weighing apparatus, showing the dispensing table assembly in combination with a supply diverting device employed in a supply member.

Furthermore, in describing any one of the first to fifth embodiments of the present invention, the plural supply chutes have been shown and described as used for supplying the articles to be weighed onto the dispensing tables. However, in place of the use of the plural supply chutes, a supply diverting device 110 adapted to be driven by an actuator (not shown) such as a solenoid unit may be employed as shown in FIG. 17, which is operable to divert the articles to be weighed onto the dispensing tables 106 one at a time. In such case, the cut edge 106a of each of the dispensing tables 106 and 106 is provided with a partition wall 107 secured thereto for preventing some of the articles to be dispensed onto one of the dispensing tables 106 from moving onto the other of the dispensing tables 106, and a generally mountain-shaped diverting member 108 is further employed so as to overhang the partition walls 107 and 107 to thereby ensure a correct diverting of the articles to be weighed.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A combination weighing apparatus comprising a generally round dispensing table assembly, a plurality of article delivery devices arranged below and radially of an outer peripheral edge of the dispensing table assembly for receiving articles to be weighed from the dispensing table assembly, and a corresponding number of weighing devices disposed below respective front ends of the delivery devices;

said dispensing table assembly being comprised of a plurality of divided dispensing tables obtained by dividing the dispensing table assembly across a geometric center thereof;

at least one of said dispensing tables including a partition wall secured to a cut edge thereof, which is left along a line of division of the dispensing table assembly, so as to extend upright;

and said at least one dispensing table having a distributing point defined at a location spaced a distance from the partition wall for distributing the articles, supplied from above the dispensing table, radially outwardly over the dispensing table, and an inclined surface area that is inclined downwardly from the distributing point towards the partition wall.

2. The combination weighing apparatus as claimed in claim 1, wherein the dispensing table has a plurality of downwardly inclined surface areas defined by a plurality of lines of division that extend from the distributing point towards an outer peripheral edge of the dispensing table, wherein some of the plural surface areas which move some of the articles towards the corresponding delivery devices are inclined at an equal angle with respect to each other.

3. The combination weighing apparatus as claimed in claim 2, wherein the surface areas that adjoin the partition wall lie substantially perpendicular to the partition wall.

4. The combination weighing apparatus as claimed in claim 1, further comprising a plurality of vibrating mechanisms operable to vibrate the associated dispensing tables, respectively, each of the vibrating mechanisms having a center of vibration that is aligned with a center of gravity of the associated dispensing table.

5. The combination weighing apparatus as claimed in claim 4, wherein each of the vibrating mechanisms is operable to vibrate the associated dispensing table up and down.

6. The combination weighing apparatus as claimed in claim 1, wherein each of the dispensing tables is formed by a bent plate member.

7. The combination weighing apparatus as claimed in claim 1, further comprising a supply member for supplying the articles to be weighed towards the distributing point, said supply member having a center of supply of the articles positioned above the distributing point.

8. The combination weighing apparatus as claimed in claim 7, wherein a top of the supply member represents an inverted conical shape.

* * * * *

UNITED STATES PATENT AND TRADEMARK OFFICE
CERTIFICATE OF CORRECTION

PATENT NO. : 6,756,546 B2
DATED : June 29, 2004
INVENTOR(S) : Toshiyuki Komatsu

It is certified that error appears in the above-identified patent and that said Letters Patent is hereby corrected as shown below:

Column 4,
Line 13, delete "the", first occurrence.

Column 7,
Line 7, insert -- . -- after "12"; and insert a new paragraph before "Each".
Line 59, change "alt" to -- art --.
Line 59, insert -- to -- after "known".

Column 16,
Line 4, delete "may".
Line 5, insert -- . -- after "level"

Signed and Sealed this

Eighth Day of February, 2005

JON W. DUDAS
*Director of the United States Patent and Trademark Office*